(12) United States Patent
Aumann et al.

(10) Patent No.: US 10,125,638 B2
(45) Date of Patent: Nov. 13, 2018

(54) CO-GENERATION SYSTEM AND ASSOCIATED METHOD

(75) Inventors: Richard Aumann, Munich (DE); Andreas Schuster, Tussenhausen (DE); Andreas Sichert, Munich (DE)

(73) Assignee: ORCAN ENERGY AG, Munich (DE)

(*) Notice: Subject to any disclaimer, the term of this patent is extended or adjusted under 35 U.S.C. 154(b) by 132 days.

(21) Appl. No.: 14/125,071

(22) PCT Filed: Jun. 12, 2012

(86) PCT No.: PCT/EP2012/002484
§ 371 (c)(1),
(2), (4) Date: Aug. 21, 2014

(87) PCT Pub. No.: WO2013/010610
PCT Pub. Date: Jan. 24, 2013

(65) Prior Publication Data
US 2017/0248039 A1 Aug. 31, 2017

(30) Foreign Application Priority Data

Jun. 22, 2011 (EP) .................................. 11005101

(51) Int. Cl.
*F01K 17/02* (2006.01)
*F01K 13/02* (2006.01)
(Continued)

(52) U.S. Cl.
CPC .............. *F01K 17/02* (2013.01); *F01K 13/02* (2013.01); *F01K 25/08* (2013.01); *F24D 3/18* (2013.01);
(Continued)

(58) Field of Classification Search
CPC .......... F01K 17/00–17/02; Y02E 20/14; Y02P 80/15; Y02B 30/625; F24D 3/18
See application file for complete search history.

(56) References Cited

U.S. PATENT DOCUMENTS

| 4,212,168 A | 7/1980 | Bouchard et al. |
| 4,733,536 A | 3/1988 | DiBella et al. |

(Continued)

FOREIGN PATENT DOCUMENTS

| DE | 2937025 A1 | 3/1980 |
| DE | 3226429 A1 * | 1/1984 | ............. F01K 17/02 |

*Primary Examiner* — Laert Dounis
(74) *Attorney, Agent, or Firm* — Moore & Van Allen PLLC; Henry B. Ward, III

(57) ABSTRACT

The present invention provides a method for operating a combined heat and power (CHP) plant comprising a heating boiler, a vaporizer, an expansion machine, and a condenser, achieved according to claim 1. The method comprises steps a), when a first condition is met: supplying a working medium to the vaporizer to obtain an at least partially evaporated working medium, feeding the (total) evaporated working medium to the expansion machine, and operating the expansion machine such that the working medium is expanded, supplying the working medium expanded by the expansion machine to the condenser, and transferring heat of the expanded working medium supplied to the condenser to a medium of a heating circuit designed to heat an object; and b) when a second condition is met which is different from the first condition: i) supplying at least a portion of the working medium to the condenser of the CHP plant without the portion of the working medium having been supplied to the expansion machine, and transferring heat of the working medium supplied to the condenser to a medium of a heating circuit designed to heat an object, and/or supplying a medium supplied from the heating boiler to the vaporizer to a heat transfer device in which heat is transferred from this medium to a medium of a heating circuit designed to heat an object.

16 Claims, 4 Drawing Sheets

(51) Int. Cl.
*F24D 12/02* (2006.01)
*F01K 25/08* (2006.01)
*F24D 3/18* (2006.01)

(52) U.S. Cl.
CPC .......... *F24D 12/02* (2013.01); *F24D 2200/12* (2013.01); *F24H 2240/00* (2013.01); *Y02B 30/14* (2013.01); *Y02E 20/14* (2013.01); *Y02P 80/15* (2015.11)

(56) References Cited

U.S. PATENT DOCUMENTS

| | | | |
|---|---|---|---|
| 5,121,607 A | | 6/1992 | George, Jr. |
| 5,473,907 A | * | 12/1995 | Briggs ...................... F24D 5/12 |
| | | | 62/238.7 |
| 2003/0029169 A1 | * | 2/2003 | Hanna .................... F01K 17/02 |
| | | | 60/651 |
| 2005/0103465 A1 | * | 5/2005 | Brasz .................... F01K 25/08 |
| | | | 165/61 |
| 2009/0211253 A1 | * | 8/2009 | Radcliff ................ F01K 23/065 |
| | | | 60/670 |
| 2011/0101119 A1 | * | 5/2011 | Schilling .................. F01K 3/00 |
| | | | 237/12.1 |

\* cited by examiner

CO-GENERATION SYSTEM AND ASSOCIATED METHOD

FIELD OF THE INVENTION

The present invention relates to combined heat and power plants and in particular to the operation of a combined heat and power plant without any need for a peak load boiler.

BACKGROUND OF THE INVENTION

In combined heat and power (CHP) plants, apart from producing power from fuels, useful heat is coupled out for heating purposes. CHP plants provide heat for heating public and private buildings. Depending on their sizes, CHP plants are in particular adequate for being used in single-family homes, residential buildings and business enterprises. Since apart from power production, CHP plants also emit heat for heating purposes, they reach higher degrees of utilization compared to steam power stations that are merely used for power production.

The heating power required by a building far sufficient heating highly depends on outside temperatures. To ensure that the building is sufficiently supplied with thermal heat even in cold weather, the CHP plant is designed for the so-called standard design temperature which is relatively low and only rarely reached at all over the year. Ta be able to use a CHP plant for heating buildings to an economically reasonable degree, it is in practice typically only designed for a fraction of the maximum heating power required according to the standard design temperature, and when the maximum heating power is actually required, it is provided by a peak load boiler. This, however, complicates the construction of the heating installation, and higher investment costs are incurred due to the need for the peak load boiler. Thus, an object underlying the present invention is to provide a CHP plant in which a sufficiently high increase in heating power, compared to normal operation, is permitted for reliably heating buildings at low outside temperatures without any need for a peak load boiler.

BRIEF SUMMARY OF THE INVENTION

The above mentioned object is achieved according to claim 1 by the method for operating a combined heat and power (CHP) plant comprising a heating boiler, a vaporizer, an expansion machine, and a condenser. The method comprises the steps of a) when a first condition is met: supplying a working medium to the vaporizer to obtain an at least partially evaporated working medium, supplying the (total) evaporated working medium to the expansion machine and operating the expansion machine such that the working medium is expanded, supplying the working medium expanded by the expansion machine to the condenser, and transferring heat of the expanded working medium supplied to the condenser to a medium of a heating circuit designed to heat an object, and b) when a second condition is met which is different from the first condition: i) supplying at least a portion of a working medium to the condenser of the CHP plant without the portion of the working medium having been supplied to the expansion machine, and transferring heat of the working medium supplied to the condenser to a medium of a heating circuit designed to heat an object, and/or ii) supplying a medium supplied from the heating boiler to the vaporizer to a heat transfer device in which heat is transferred from this medium to a medium of a heating circuit (heating medium) designed to heat an object.

It will be understood that according to b) ii), the medium supplied from the heating boiler to the vaporizer is in particular supplied, after having passed the vaporizer, to the heat transfer device for transferring heat to the heating medium. It will also be understood that the heating medium may in principle be directly used for heating the building or for heating another medium that will flow through a number of heating surfaces in the building to be heated.

So, according to the method of the invention, the CHP plant may be operated in at least two different modes. It is either operated like a conventional CHP plant, so that a portion of the energy obtained, for example, by burning fuel and provided for heating the working medium is supplied via the expansion machine to a generator for generating power, and the expanded working medium is utilized for heating purposes. Or it is used in such a way that precisely not the total heated (evaporated) working medium is supplied to the expansion machine, but at least a portion of the same is guided past the expansion machine, so that it may be directly used for heating purposes. This may be achieved by a bypass line with a bypass valve. The medium that is provided for evaporating the working medium in the vaporizer may also dissipate part of its heat to the heating medium or be identical to the heating medium. So, if an increased demand of heating power compared to the normal demand occurs, operation will change from a) to b). An increased demand may in particular occur by the outside temperature of a building to be heated by the CHP plant falling below a predetermined value.

So, the above mentioned first and second conditions may be given by the outside temperature of a building to be heated by the CHP plant failing below a respective predetermined value. In principle, the CHP plant will cover a heat demand which correlates with the outside temperature of the building to be heated. The first condition may be given by falling short of a certain heating power, for example caused when a first outside temperature threshold is exceeded, where the heating power is higher than a minimum power typical of the plant. The minimum power here correlates with a starting threshold as of which the plant starts to operate.

So, the change from a) to b) helps to achieve an increased heating power without a peak load boiler having to be provided for this. The first mode a) is also referred to as CHP operating mode, and the second mode b) is also referred to as heating operation mode.

The CHP plant may in particular be an Organic Rankine Cycle (ORC) plant. ORC plants constitute the realization of the Clausius Rankine cycle where electric energy is, for example, in principle obtained by adiabatic and isobaric changes of state of an organic working medium. By means of vaporization, expansion and subsequent condensation of the working medium, mechanical energy is obtained here and converted into electric energy. In principle, the working medium is brought to the operating pressure by a feed pump, and energy in the form of heat provided by combustion or by a flow of waste heat is supplied to it in a heat exchanger. The working medium flows from the vaporizer via a pressure pipe to an ORC turbine where it is expanded to a lower pressure. Subsequently, the expanded working medium steam flows through a condenser where heat exchange takes place between the vaporous working medium and a cooling medium, whereupon the condensed-out working medium is returned to the vaporizer by a feed pump in a cyclic process (cf. also detailed description below).

According to a further development, the CHP plant may also be operated in a third mode c). When a third condition, which is different from the first and second conditions, is met, a working medium is supplied to the expansion machine and the expansion machine is operated in such a way that the working medium is compressed, the working medium compressed by the expansion machine is supplied to the condenser, and heat of the compressed working medium supplied to the condenser is transferred to a medium of a heating circuit which is embodied for heating an object. In this third mode, the CHP plant thus works as a heat pump.

So, the term "expansion machine" is here to be understood in a broader sense than is generally common. In modes a) and b), the expansion machine indeed expands the heated (evaporated) working medium. In mode c), the heat pump mode, however, it compresses the working medium. For this, it is necessary that the sense of rotation of the expansion machine may be reversed compared to the CHP mode. This operation mode permits a further increase in the heating power compared to mode b). For example, the CHP plant may be switched from mode a) to mode b) when the outside temperature of a building to be heated by the CHP plant falls below a predetermined first value, and it may be switched from mode b) to mode c) when the outside temperature of the building to be heated by the CHP plant subsequently falls below a predetermined second value which is lower than the predetermined first value.

Thus, according to the above examples, the CHP plant may in particular comprise three circuits. One of these circuits may be formed by the ORC in which the organic working medium is supplied from a pump to the vaporizer where it is at least partially evaporated and from which the evaporated working medium is supplied to the expansion machine through which it is expanded (in modes a) and b)). From the expansion machine, the expanded working medium steam is supplied to the condenser for condensation.

In the second circuit, the medium which is guided from the heating boiler through the vaporizer circulates. This medium, for example water, is heated in the heating boiler and supplied from there to the vaporizer. In the vaporizer, the working medium is evaporated with its heat. From the vaporizer, it is again supplied to the heating boiler, for example by means of a feed pump. Before it is supplied to the heating boiler again, however, it may be guided through a heat transfer device (reheating device) in which it will heat the medium of the third circuit.

In the third circuit, the heating medium, for example water, circulates and is used for heating a building, optionally by heat transfer to a further medium which flows through heating surfaces. This can be a low-temperature circuit, in contrast to an intermediate hot water circuit of the first circuit. The heating medium may be heated with the aid of a condenser in which the working medium is condensed while dissipating heat. In addition or as an alternative, the heating medium may be heated in the mentioned reheating device in which heat may be transferred from the medium heated in the heating boiler and guided through the vaporizer to the heating medium. In the condenser and/or the reheating device, the heating medium may be heated from approx. 30° C. to approx. 45° C.

The medium that is supplied from the heating boiler to the vaporizer to evaporate the working medium at least partially may be, before being supplied again to the heating boiler, optionally after having passed the preheater, guided through an economizer (heat exchanger) in which heat of a fuel used for heating the heating boiler or of the flue gas is transferred to the medium The CHP plant may be operated with any conventional fuel, such as coal, gas or wood. The flue gas formed when the fuel is burnt is used for heating the medium supplied to the heating boiler in the second circuit. The flue gas may be discharged through a chimney. Before being supplied to the chimney, however, it may be guided through the economizer in the mentioned example. The latter is an apparatus in which heat is transferred from the flue gas to the medium which is supplied to the heating boiler. So, it functions as a heat exchanger for preheating the medium which is heated in the heating boiler and finally serves for evaporating the working medium in the vaporizer.

According to a further development, in mode c), the heat pump mode, the working medium is not guided through the vaporizer. In this mode, the working medium is not expanded in the expansion machine for driving a generator and thus does not have to be evaporated beforehand. It may be supplied past the vaporizer directly to the expansion machine through a bypass line controlled by a corresponding valve.

The above mentioned object is also achieved by providing a combined heat and power plant (CHP), comprising
a vaporizer designed to evaporate a working medium;
an expansion machine designed to expand or compress the evaporated working medium;
a condenser designed to condense the expanded or compressed working medium; and
a first bypass line with a first valve designed to supply, via the first valve, at least a portion of the evaporated working medium supplied by the vaporizer past the expansion machine to the condenser.

The first bypass line permits to supply at least a portion of the working medium without it being expanded corresponding to the above mentioned heating operating mode to the condenser for transferring heat to the medium used for heating a building (heating medium) of the above mentioned third circuit. The CHP plant may be an ORC plant comprising an Organic Rankine Cycle for the organic working medium.

The CHP plant may comprise a number of valves and a control device and be designed to
a) when a first condition is met, control the number of valves such that the working medium is supplied to the vaporizer to obtain an at least partially evaporated working medium, supply the evaporated working medium to the expansion machine such that the working medium is expanded, and supply the evaporated working medium expanded through the expansion machine to the condenser, so that heat of the expanded working medium supplied to the condenser is transferred to a medium of a heating circuit which is designed to heat an object; and
b) when a second condition, which is different from the first condition, is met, control the number of valves such that at least a portion of a working medium is supplied to the condenser of the CHP plant, without the portion of the working medium having been supplied to the expansion machine, and heat of the working medium supplied to the condenser is transferred to a medium of a heating circuit which is designed to heat an object, and/or ii) a medium supplied from the heating boiler to the vaporizer is supplied to a heat transfer device, so that heat is transferred from this medium to a medium of a heating circuit (heating medium) which is designed to heat an object.

The control device may furthermore be designed, when a third condition is met which is different from the first and the second conditions, to
control the number of valves such that a working medium is supplied to the expansion machine,
operate the expansion machine such that the working medium is compressed, and
supply the working medium compressed by the expansion machine to the condenser, so that heat of the compressed working medium supplied to the condenser is transferred to a medium of a heating circuit which is designed to heat an object.

As it is described above with respect to the method according to the invention, the conditions may consist in falling short of corresponding temperature values outside a building to be heated by the CHP plant.

According to a further development, the CHP plant furthermore comprises a second bypass line which is designed to guide the working medium past the vaporizer to the expansion machine. This may be advantageous for the operation in the heat pump mode in which the working medium is compressed by the sense of rotation of the expansion machine being reversed compared to normal operation.

BRIEF DESCRIPTION OF THE DRAWINGS

Further features and exemplary embodiments as well as advantages of the present invention will be illustrated more in detail hereinafter with reference to the drawings. It will be understood that the embodiments do not exhaust the field of the present invention. It will be furthermore understood that some or all features described below may also be combined with each other in a different way.

DETAILED DESCRIPTION OF THE INVENTION

Figure 1:
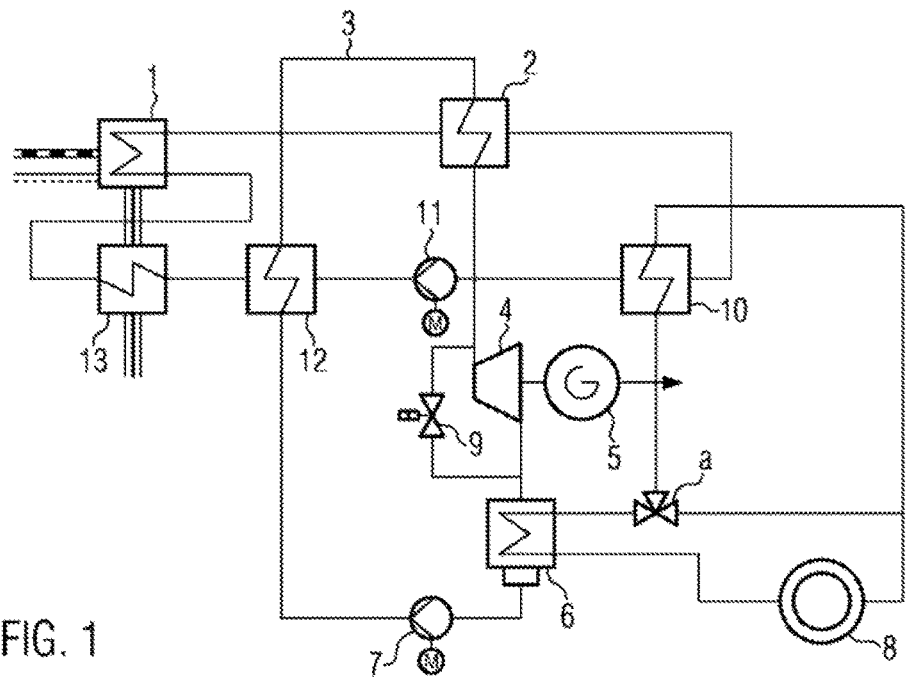

FIG. 1 represents an example of a CHP plant according to the invention in which a bypass line is provided to supply at least a portion of a working medium steam supplied by a vaporizer past an expansion machine directly to a condenser for transferring heat to a heating medium.

Figure 2:
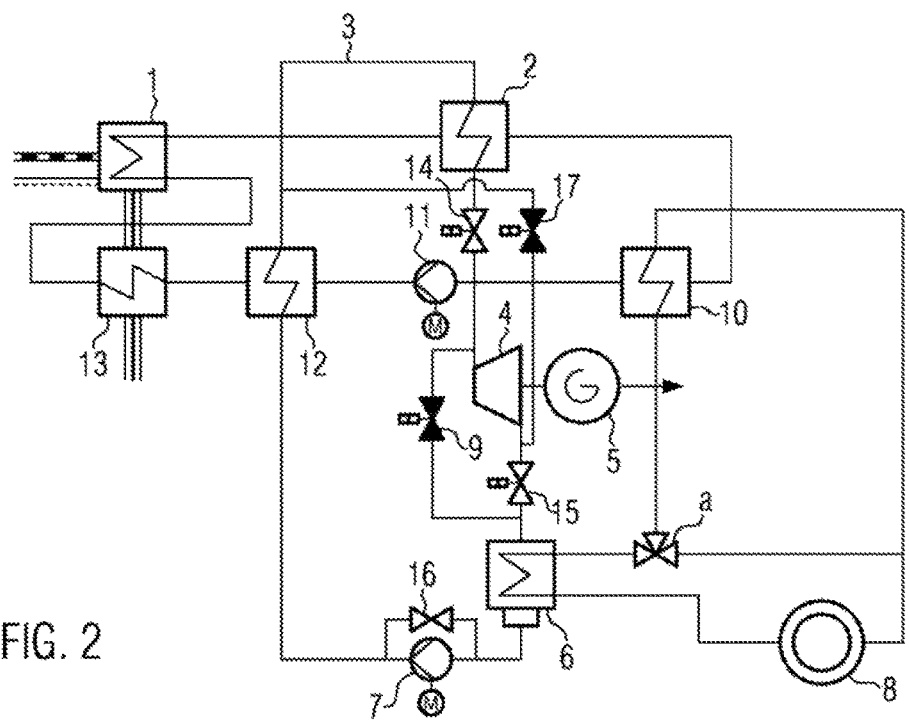

FIG. 2 shows another example of a CHP plant according to the invention in which an additional bypass line for bypassing the expansion machine is provided. In the shown example, the operation of the plant in the CHP operating mode is illustrated.

Figure 3:
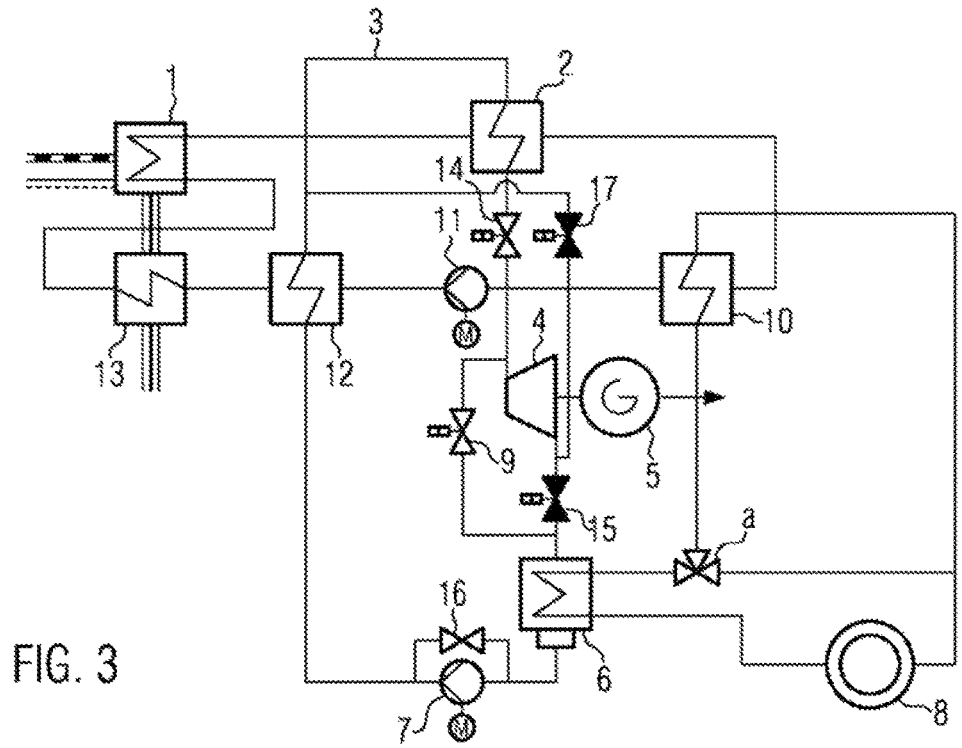

FIG. 3 shows another example of a CHP plant according to the invention in which a bypass line for bypassing the expansion machine is provided. In the shown example, the operation of the plant in the CHP operating mode is illustrated.

Figure 4:
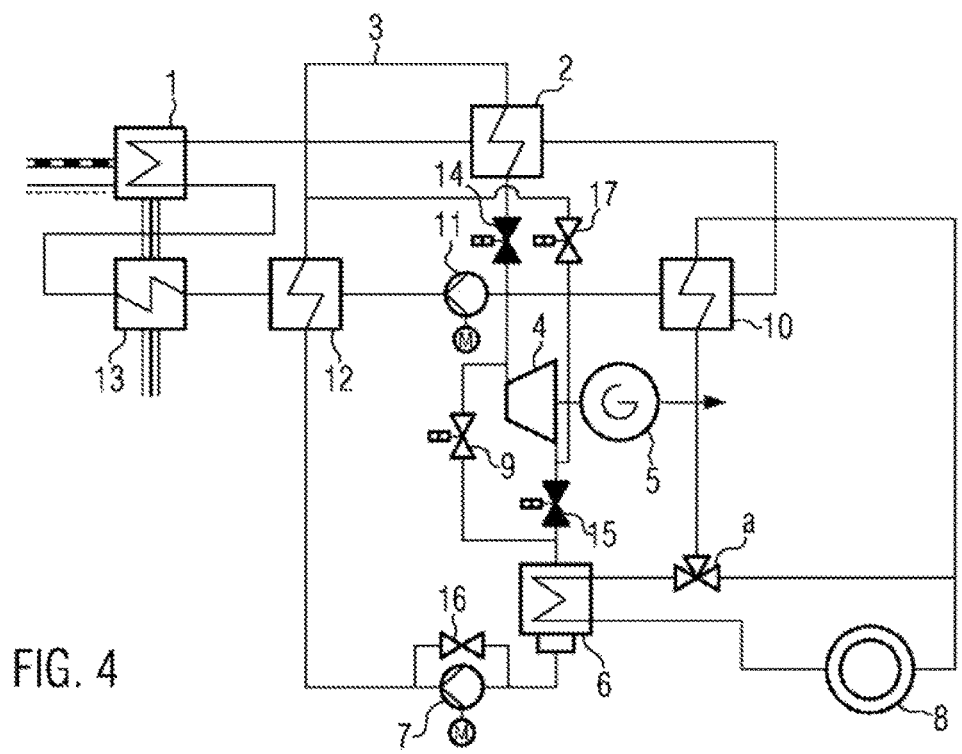

FIG. 4 shows another example of a CHP plant according to the invention in which a bypass line for bypassing the expansion machine is provided. In the shown example, the operation of the plant in the heat pump mode is illustrated.

Figure 5:
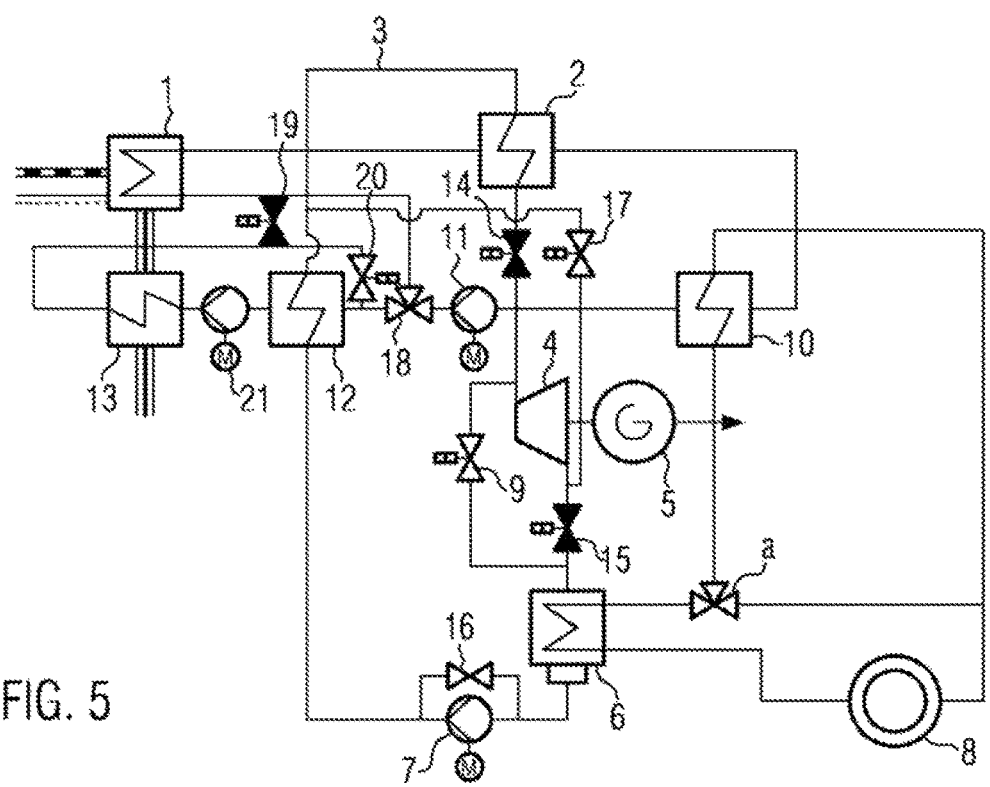

FIG. 5 shows another example of a CHP plant according to the invention in which a circuit for a medium which is guided from a heating boiler to a vaporizer to there transfer heat to a working medium is subdivided into two subcircuits by valves.

Figure 6:
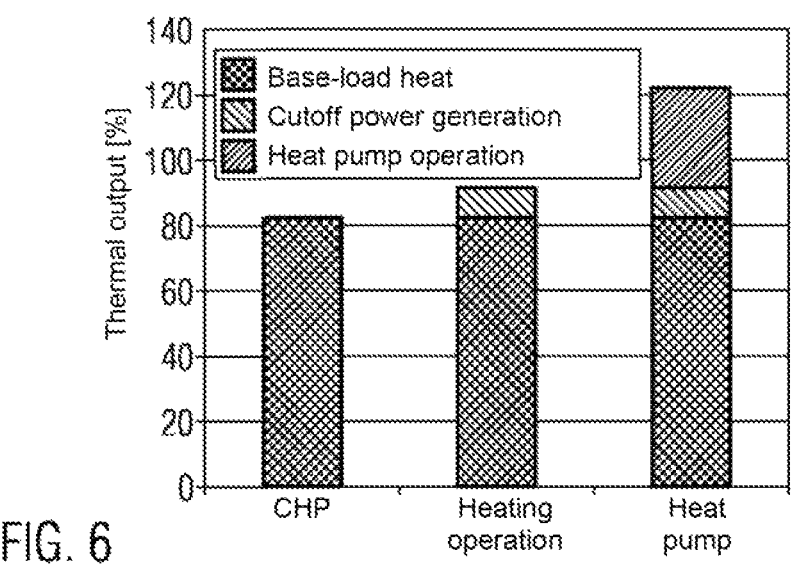

FIG. 6 illustrates the thermal output of a CHP plant according to the invention in response to the different operating modes.

Figure 7:
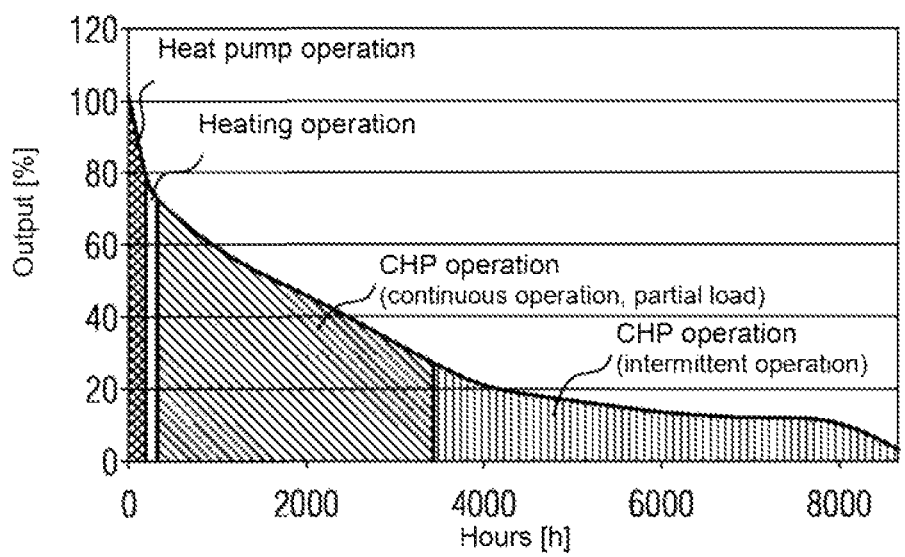

FIG. 7 shows a continuous annual line for a CHP plant according to the invention.

An example of a CHP plant according to the invention is shown in FIG. 1. In the shown example, a heating boiler 1 with an ORC for producing power and heat for heating purposes is shown. In the heating boiler 1, water is heated. The energy for heating the water is obtained, for example, by burning fuel, for example coal, natural gas, heating oil, wood, pellets, or it is obtained geothermally or solar thermally. The water is heated in the heating boiler 1 to a temperature of, for example, approx. 140° C. The heated water is supplied to a vaporizer 2. In the vaporizer, an organic working medium of the ORC is evaporated. As a working medium, any "dry media", such as R245fa, "wet media", such as ethanol, or "isentropic media", such as R134a, as they are used, in conventional ORC plants, may be used. Synthetic silicone-based working media, such as GL160, may also be employed.

In the vaporizer 2, heat is supplied to an organic working medium of the ORC 3. For example, the organic working medium is completely evaporated in the vaporizer 2. The working medium steam is supplied to an expansion machine 4 via a pressure line. In the expansion machine 4, the working medium steam is expanded, and the expansion machine 4 drives a generator 5 for obtaining electric energy. The expanded working medium steam is condensed in a condenser 6, and the liquefied working medium is returned to the vaporizer 2 via a feed pump 7. A preheater 12 may also be provided (see below). In this case, heat is supplied to the organic working medium in the preheater 12, and the liquefied working medium is returned via the feed pump 7 first to the preheater 12 and then to the vaporizer 2.

Apart from power generation, heat is obtained for heating purposes. This is accomplished by dissipating condensation heat arising at the condenser 6 to a heating circuit, for example a low-temperature heating circuit. In this low-temperature heating circuit, water is heated at the condenser 6 and supplied to a heating plant 8, from where it is returned again to the condenser 6 after having cooled down due to the heating of a building. For example, the water is supplied to the condenser 6 at a temperature of approx. 30° C. and heated by the condenser 6 to a temperature of approx. 45° C. If this temperature and the transferred power are sufficient for heating, the water may be supplied through valve a directly to the heating circuit.

The exemplary CHP plant shown in FIG. 1 has, according to the invention, a bypass valve 9 which controls a bypass line for bypassing the expansion machine 4. If the thermal output demand for heating a building at low outside temperatures is increased compared to the normal operation of the CHP plant, via the condenser 6, heat may be additionally transferred to the low-temperature heating circuit by at least partially opening the bypass valve 9, so that at least a portion of the working medium steam is supplied directly to the condenser 6 for condensation, i.e. without expansion at the expansion machine 4. As in general approx. 10% of the heat produced in the heating boiler 1 may be used for power production, the thermal output of the CHP plant may in principle be increased by completely opening the bypass valve 9 by approx. 10% compared to normal operation.

In the example shown in FIG. 1, for increasing the overall efficiency of the CHP plant, further elements are provided. For example, a reheater 10 through which medium may flow completely or partially via valve a takes care of a utilization of the heat of the water flowing from the vaporizer 2 of the intermediate hot water circuit within which the heat required for evaporating the working medium of the ORC is provided, for heating a building via the low-temperature circuit. The water of the intermediate hot water circuit that is further cooled down by the reheater 10 is supplied via a pump 11 to a preheater 12 via which the organic working medium delivered by the feed pump 7 is supplied to the vaporizer 2. Thus, in an economizer 13, additional heat may be absorbed by the flue gas which finally escapes from a chimney after having cooled down in the economizer 13.

As an alternative, the CRC may be switched off and heat may be transferred via the reheater 10 from the intermediate hot water circuit to the heating medium of the heating circuit.

Another example of a CHP plant according to the invention is shown in FIGS. 2 and 3. The CHP plant shown in FIGS. 2 and 3 comprises all features of the CHP plant shown in FIG. 1. in addition, three valves 14, 15 and 16 are provided, and a further valve 17 controls the bypass around the vaporizer 2. The valve 17 furthermore permits the reversal of the direction of flow through the expansion machine and thereby the operation as a compression machine. For the valves, for example solenoid valves may be used, valve 16 may represent a throttle valve.

In FIG. 2, the valves are controlled according to a certain CHP mode. The valves which are filled with black color are closed valves (see valves 9 and 17), while the valves with the triangular areas that are not filled in the switching symbols represent opened valves (see valves 14, 15 and 16). Both bypass lines are closed by the valves 9 and 17.

Sufficient heat is generated at the condenser 6 and dissipated to the heating circuit for heating the building.

If a situation arises in which an increased heating power is required, the CHP plant is, as is shown in FIG. 3, operated in a pure heating operation. The bypass valve 9 will be opened, so that the working medium steam is supplied without expansion through the expansion machine 4 past the latter to the condenser 6 for condensation, it is alternatively also possible to exchange the heat of the medium heated in the heating boiler 1 essentially via the reheater 10 by shutting down the ORC by switching off the feed pump 7. If no throttle valve is used for the valve 16, the valve 16 may in particular be opened to switch off the ORC by passing by the feed pump 7. In these cases, the position of the valve a is such that medium flows completely or partially through the reheater 10. It will be understood that by various combinations of partially or completely opened or closed valves, different degrees of utilization in view of the heating power may be realized.

FIG. 4 shows the operation of the CHP plant in the operating mode of a heat pump. This operation permits a further increase in heating power. For this, it is necessary that the sense of rotation of the expansion machine 4 may be reversed compared to the CHP mode. This is permitted, for example, by the expansion machine 4 being operated via a frequency converter (for example a four-quadrant frequency converter). In the heat pump mode, the organic working medium is thus compressed instead of being expanded. In this mode, the bypass lines are opened by the valves 9 and 17, and the direct connection from the vaporizer 2 to the expansion machine 4 and the direct connection from the expansion machine 4 to the condenser 6 are closed via the valves 14 and 15. The preheater 12 of the CHP operation now functions as vaporizer. The steam formed there is compressed by the expansion machine 4 which now functions as compression machine. In the economizer 13, a very efficient cooling of the flue gas takes place, so that the water vapor in the flue gas is almost completely condensed and thus an increased utilization of useful heat is permitted.

According to a variant, the line of the working medium through the vaporizer 2 is bypassed in the heat pump mode. This may be realized, for example, by providing a further bypass line controlled by a corresponding valve which bypasses the vaporizer 2 and supplies the working medium directly to the expansion machine 4 which has a compressing effect in this mode.

According to a further variant shown in FIG. 5, the intermediate hot water circuit is, in the heat pump mode, subdivided into a circuit A which is directly connected to the heating boiler 1 and a circuit B of a lower temperature which is directly connected with the economizer 13 via corresponding valves 18, 19 and 20. Thus, no mixing of the hot and cooled-down water flows takes place, whereby temperature is lower in circuit B of a lower temperature than would be the case without a separation of circuits A and B. Moreover, a pump 21 may be provided for delivering the medium coming from the preheater 12 to the economizer 13.

The efficiency of the inventive CHP plant according to the above examples is illustrated in FIG. 6. As is shown, the thermal output is, based on the calorific value of the employed fuel, increased by approx. 10% in the heating operation mode compared to the thermal output in the CHP mode. In the operating mode of the heat pump, an increase in the thermal output or heating power of approx. 30% results.

FIG. 7 shows the annual continuous line for an example of a CHP plant according to the invention. For a small number of days in the year (very cold winter days), the CHP plant is driven in the heat pump or heating operation mode. During the major part of the year, the CHP plant is driven in the CHP mode. On days where the minimum power is not reached, an intermittent CHP operating mode is employed.

As was described, the construction of a CHP plant according to the invention, which permits the operation both in the heating operation mode and in the heat pump mode, may guarantee the reliable heating of buildings over the year without any need for a peak load boiler.

The invention claimed is:

1. Method for operating a combined heat and power (CHP) plant comprising a heating boiler, a vaporizer, an expansion/compression machine, and a condenser, comprising the steps of:
   a) when a first condition is met: supplying a working medium to the vaporizer to obtain an at least partially evaporated working medium, feeding the (total) evaporated working medium to the expansion/compression machine, and operating the expansion/compression machine such that the working medium is expanded, supplying the working medium expanded by the expansion/compression machine to the condenser, and transferring heat of the working medium supplied to the condenser to a second medium of a heating circuit designed to heat an object;
   b) when a second condition is met which is different from the first condition: supplying a third medium circulating between the heating boiler and the vaporizer to a heat transfer device in which heat is transferred from the third medium to the second medium of the heating circuit designed to heat the object; and
   c) when a third condition is met which is different from the first and the second conditions: supplying the working medium to the expansion/compression machine and operating the expansion/compression machine such that the working medium is compressed, supplying the working medium compressed by the expansion/compression machine to the condenser, and transferring heat of the compressed working medium supplied to the condenser to the second medium of the heating circuit which is designed to heat the object;

wherein the first condition comprises a normal demand of heating power, and/or the second condition comprises exceeding the normal demand of heating power by a first amount; and wherein the third condition comprises exceeding the normal demand of heating power by a second amount that is larger than the first amount.

2. Method according to claim 1, in which the CHP plant is an Organic Rankine Cycle plant, and the working medium is an organic working medium.

3. Method according to claim 1, in which the second medium heated in the condenser and/or in the heat transfer device is a medium of a low-temperature circuit having a maximum temperature of below 50° C.

4. Method according to claim 1, in which the third medium is supplied from the heating boiler to the vaporizer to at least partially evaporate the working medium, and the third medium is subsequently guided through a preheater through which the working medium is guided before being supplied to the vaporizer, so that the third medium is cooled in the preheater and the working medium is heated in the preheater.

5. Method according to claim 1, in which the third medium is supplied from the heating boiler to the vaporizer to at least partially evaporate the working medium, and the third medium is subsequently guided through an economizer in which heat of a fuel used for heating the heating boiler is transferred to the third medium.

6. Method according to claim 1, in which in step a), heat is also transferred to the second medium of the heating circuit by a reheating device through which the third medium flows which was previously guided from the heating boiler through the vaporizer to at least partially evaporate the working medium.

7. Method according to claim 1, in which in step c), the working medium is not guided through the vaporizer.

8. Method according to claim 1, in which the first condition comprises exceeding a first outside temperature threshold of the object to be heated, and/or the second condition comprises falling below a second outside temperature threshold of the object to be heated.

9. Method according to claim 8, wherein the second outside temperature threshold is identical to the first outside temperature threshold.

10. Method according to claim 8, in which the third condition comprises falling below a third outside temperature threshold of the object to be heated, wherein the third outside temperature threshold is lower than the second outside temperature threshold.

11. Method according to claim 1, further comprising when the second condition is met supplying at least a portion of the working medium to the condenser of the CHP plant without the portion of the working medium having been supplied to the expansion/compression machine, and transferring heat of the working medium supplied to the condenser to the second medium of the heating circuit designed to heat the object.

12. Combined heat and power (CHP) plant, comprising:
a heating boiler;
a vaporizer designed to evaporate a working medium;
an expansion/compression machine designed to expand or compress the evaporated working medium;
a condenser designed to condense the expanded or compressed working medium;

a first bypass line with a first valve designed to supply, via the first valve, at least a portion of the evaporated working medium supplied by the vaporizer past the expansion/compression machine to the condenser; and furthermore comprising a number of valves and a control device, designed to:
a) when a first condition is met, control the number of valves such that the working medium is supplied to the vaporizer to obtain an at least partially evaporated working medium, the total evaporated working medium is supplied to the expansion/compression machine such that the working medium is expanded, and the evaporated working medium expanded through the expansion/compression machine is supplied to the condenser, so that heat of the expanded working medium supplied to the condenser is transferred to a second medium of a heating circuit which is designed to heat an object;
b) when a second condition is met which is different from the first condition, control the number of valves such that a third medium circulating between the heating boiler and the vaporizer is supplied to a heat transfer device, so that heat is transferred from the third medium to the second medium of the heating circuit (heating medium) which is designed to heat the object; and
c) when a third condition is met which is different from the first and the second conditions: control the number of valves such that the working medium is supplied to the expansion/compression machine and operating the expansion/compression machine such that the working medium is compressed, supplying the working medium compressed by the expansion/compression machine to the condenser, and transferring heat of the compressed working medium supplied to the condenser to the second medium of the heating circuit which is designed to heat the object;

wherein the first condition comprises a normal demand of heating power, and/or the second condition comprises exceeding the normal demand of heating power by a first amount; and wherein the third condition comprises exceeding the normal demand of heating power by a second amount that is larger than the first amount.

13. CHP plant according to claim 12, furthermore comprising a second bypass line which is designed to guide the working medium past the vaporizer to the expansion/compression machine.

14. CHP plant according to claim 12, comprising an Organic Rankine Cycle for an organic working medium.

15. CHP plant according to claim 12, in which the expansion/compression machine is designed to operate in a first sense of rotation for the expansion of the working medium, and in a second sense of rotation for the compression of the working medium.

16. CHP plant according to claim 12, wherein the control device is designed to, when the second condition is met, control the number of valves such that at least a portion of the working medium is supplied to the condenser of the CHP plant without the portion of the working medium having been supplied to the expansion/compression machine, and heat of the working medium supplied to the condenser is transferred to the second medium of the heating circuit which is designed to heat the object.

* * * * *